(12) United States Patent
Kobayashi

(10) Patent No.: US 9,975,519 B2
(45) Date of Patent: May 22, 2018

(54) SIDE AIRBAG APPARATUS FOR VEHICLE

(71) Applicant: Autoliv Development AB, Vårgårda (SE)

(72) Inventor: Yuto Kobayashi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days. days.

(21) Appl. No.: 15/305,477

(22) PCT Filed: Apr. 8, 2015

(86) PCT No.: PCT/JP2015/060978
§ 371 (c)(1),
(2) Date: Oct. 20, 2016

(87) PCT Pub. No.: WO2015/166774
PCT Pub. Date: Nov. 5, 2015

(65) Prior Publication Data
US 2017/0043741 A1 Feb. 16, 2017

(30) Foreign Application Priority Data
Apr. 30, 2014 (JP) ................................. 2014-094080

(51) Int. Cl.
*B60R 21/237* (2006.01)
*B60N 2/42* (2006.01)
(Continued)

(52) U.S. Cl.
CPC .............. *B60R 21/237* (2013.01); *B60N 2/42* (2013.01); *B60R 21/207* (2013.01); *B60R 21/23138* (2013.01); *B60R 2021/23146* (2013.01)

(58) Field of Classification Search
CPC ............ B60R 21/237; B60R 21/23138; B60R 21/207; B60R 2021/23146; B60N 2/42
See application file for complete search history.

(56) References Cited

U.S. PATENT DOCUMENTS 5,890,732 A * 4/1999 Nakamura ........ B60R 21/23138
280/729
5,899,490 A * 5/1999 Wipasuramonton .. B60R 21/237
280/730.2
(Continued)

FOREIGN PATENT DOCUMENTS

| JP | 8-142790 | 6/1996 |
| JP | 11-152004 | 6/1999 |

(Continued)

OTHER PUBLICATIONS

PCT International Search Report—Jun. 23, 2015.

*Primary Examiner* — Darlene P Condra
(74) *Attorney, Agent, or Firm* — Brinks Gilson & Lione

(57) ABSTRACT

A side airbag (2), for mounting to a seat frame (7) having a support surface (7a) facing a vehicle door. An inflator (6) is stored inside the side airbag near a rear end in a deployment and inflation direction. The side airbag has a folded portion (X1) with a folding line (F1) and a superposed portion (S) sequentially from the side of the inflator to a front end thereof in the deployment and inflation direction. The folded portion has an abutment portion (Q) folded back to a vehicle rear side from a vehicle front side on a front side of the inflator in a vehicle front-back direction along the folding line and abutted against the support surface. The superposed portion is formed in a rolled and superposed state, and the folded portion is arranged between the support surface and the superposed portion in the vehicle-widthwise.

10 Claims, 17 Drawing Sheets

(51) Int. Cl.
　　　*B60R 21/207*　　(2006.01)
　　　*B60R 21/231*　　(2011.01)

(56) References Cited

U.S. PATENT DOCUMENTS

| | | | | |
|---|---|---|---|---|
| 5,906,395 | A * | 5/1999 | Isaji | B60R 21/207 |
| | | | | 280/728.2 |
| 5,992,882 | A * | 11/1999 | Ito | B60R 21/207 |
| | | | | 280/728.1 |
| 6,186,544 | B1 * | 2/2001 | Igawa | B60R 21/237 |
| | | | | 280/732 |
| 7,156,458 | B2 * | 1/2007 | Hanberg | A47C 31/113 |
| | | | | 297/219.1 |
| 7,798,523 | B2 * | 9/2010 | Shigemura | B60R 21/207 |
| | | | | 280/730.2 |
| 9,120,455 | B2 * | 9/2015 | Sugimoto | B60R 21/231 |
| 9,333,932 | B2 * | 5/2016 | Sakai | B60R 21/205 |
| 2008/0174093 | A1 * | 7/2008 | Inoue | B60R 21/207 |
| | | | | 280/730.2 |
| 2009/0160166 | A1 * | 6/2009 | Kataoka | B60R 21/207 |
| | | | | 280/730.2 |
| 2013/0241184 | A1 * | 9/2013 | Sakai | B60R 21/205 |
| | | | | 280/743.1 |
| 2014/0151984 | A1 * | 6/2014 | Fukawatase | B60R 21/233 |
| | | | | 280/730.2 |
| 2015/0021887 | A1 * | 1/2015 | Hiraiwa | B60R 21/233 |
| | | | | 280/729 |
| 2016/0031406 | A1 * | 2/2016 | Yamanaka | B60R 21/26 |
| | | | | 280/728.2 |
| 2017/0158160 | A1 * | 6/2017 | Sugimori | B60R 21/207 |

FOREIGN PATENT DOCUMENTS

| | | |
|---|---|---|
| JP | 11-180243 | 7/1999 |
| JP | 2001-171468 | 6/2001 |
| JP | 2007-216821 | 8/2007 |

* cited by examiner

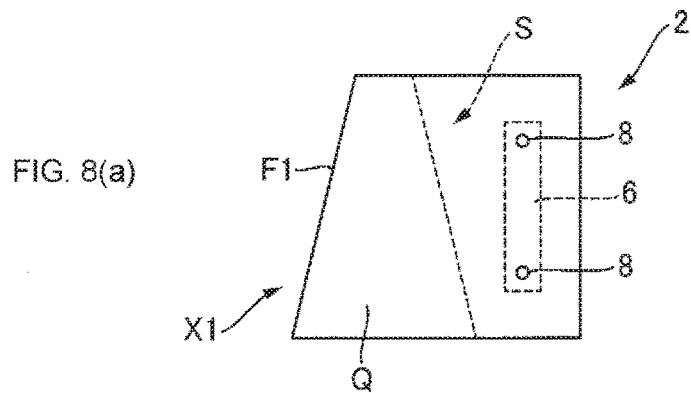
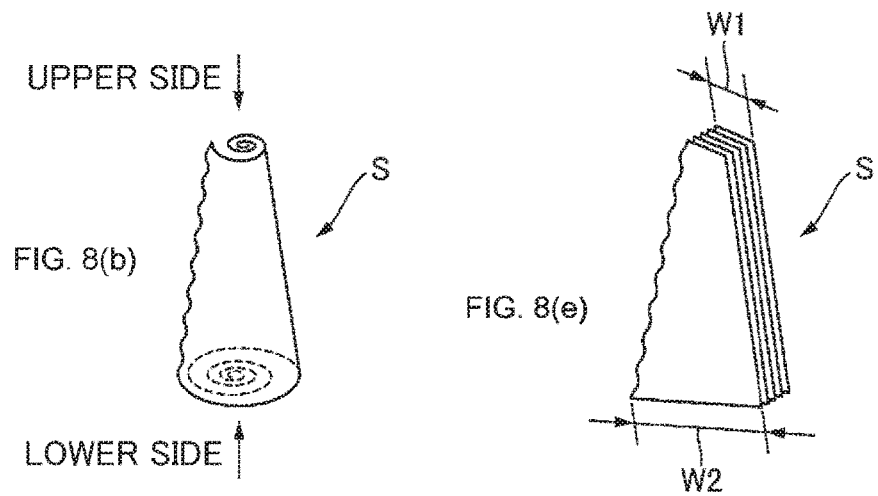
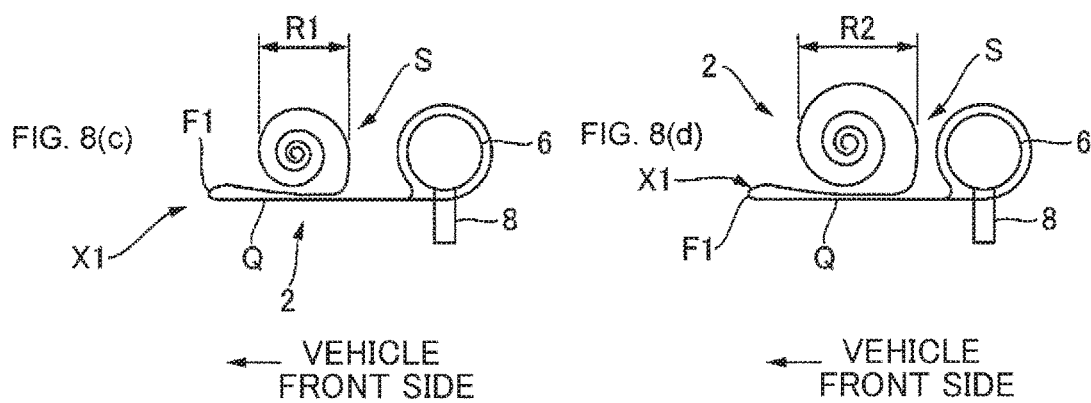

← VEHICLE FRONT SIDE

← VEHICLE FRONT SIDE

FIG. 17
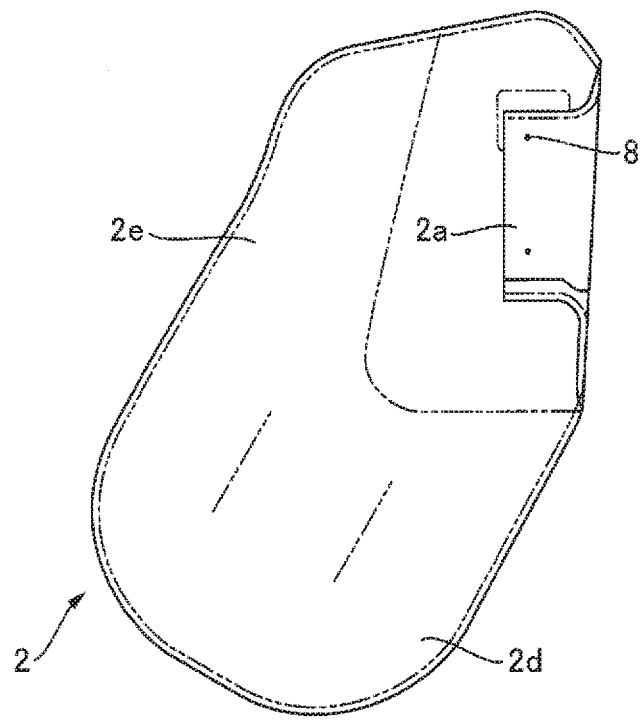
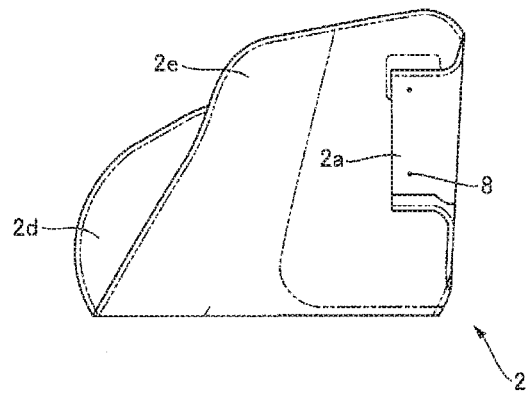
FIG. 18

SIDE AIRBAG APPARATUS FOR VEHICLE

CROSS REFERENCE TO RELATED APPLICATIONS

This application claims priority to Japanese Patent Application No. 2014-094080, filed on Apr. 30, 2014 and PCT/JP2015/060978, filed on Apr. 8, 2015.

FIELD OF THE INVENTION

The present invention relates to a vehicle side airbag device capable of reducing/alleviating the movement of a deployed and inflated side airbag to jerk up the arm of an occupant and improving the occupant restraining performance.

BACKGROUND

Japanese Patent Application Publication No. H8-142790, Japanese Patent Application Publication No. H11-152004, and Japanese Patent Application Publication No. H11-180243 disclose prior-art techniques related to vehicle side airbag devices, which include taking up a side airbag obliquely with respect to the vertical direction and spreading the side airbag upward in the process of deployment and inflation.

The airbag device for side collision disclosed in Japanese Patent Application Publication No. H8-142790 is aimed to deploy an airbag quickly after detection of a side collision, and the airbag is folded into a long band shape in the deployment direction and in a spirally rolled state while its surface, which is to face the vehicle interior side wall during deployment, is positioned outside, and the airbag is adapted to be deployed forward as its outer side surface is abutted against the vehicle interior side wall and the rolled state is unfolded upon a side collision.

The structure and method for folding an airbag in Japanese Patent Application Publication No. H11-152004 is directed to the object of providing a structure and method for folding an airbag that allows improved deployment speed and smooth deployment behavior to be obtained, and here, a head protection portion is rolled a number of times while its protection surface faces inside, the head protection portion is pushed into a chest protection portion, and at this time, part of the chest protection portion coupled to the head protection portion is pushed into the chest protection portion.

The airbag device for side collision disclosed in Japanese Patent Application Publication No. H11-180243 is aimed to provide an airbag device for side collision capable of providing a folded airbag near an upper end of the backrest of a seat without preventing smooth inflation of the airbag, and the airbag device for side collision has the folded airbag on the upper side of the backrest of the seat. The airbag is attached and fixed to the seat frame in a plurality of locations in the vertical direction on the rear edge side and has a lower chamber upstream of inflation gas and an upper chamber provided above the front side of the lower chamber, and the airbag is stored in a folded state and adapted to project forward and deployed upward during inflation. The airbag is provided with radial folding lines around the upper part side of the lower chamber on the rear edge side, and the upper chamber and the lower chamber are folded in a sector shape and stored on the rear edge side of the lower chamber.

SUMMARY AND INTRODUCTORY DESCRIPTION OF INVENTION

A side airbag is provided as a countermeasure against a side collision and deployed and inflated toward the vehicle front side between an occupant and a vehicle component, such as a door, that is positioned laterally to the occupant in the vehicle-widthwise direction. In the above-described background art, the side airbag is intended to spread swiftly and smoothly upward. Here, the side airbag may enter below the arm of the occupant or the arm of the occupant may be unintendedly positioned above the side airbag and directly jerked up by the side airbag in a violent, instantaneous manner, which can place an unwanted load upon the occupant and may bring the occupant into an unbalanced position, such that desired occupant restraining performance may not be provided.

The present invention is devised in view of the above-described problem associated with the prior art, and it is an object of the present invention to provide a vehicle side airbag device capable of reducing/alleviating the movement of a deployed and inflated airbag to jerk up the arm of an occupant and improving the occupant restraining performance.

A vehicle side airbag device according to the present invention includes a side airbag provided inside a vehicle seat and allowed to be deployed and inflated from the seat into between an occupant and a vehicle component positioned laterally to the occupant in a vehicle-widthwise direction and an inflator attachable to a seat frame of the seat and causing inflator gas to be introduced into the side airbag. The inflator is stored inside the side airbag near a rear end thereof in a deployment and inflation direction, in a spread state, the side airbag has a folded portion with a folding line and a superposed portion in series sequentially from a side of the inflator to a front end thereof in the deployment and inflation direction. In a stored state before deployment, the folded portion is formed to include an abutment portion folded back to a vehicle rear side from a vehicle front side and abutted against the seat frame during attachment to the seat on a front side of the inflator in a vehicle front-back direction, the superposed portion is formed to be superposed in a rolled state or folded in a bellows-like state to have a lower part wider than an upper part in an up-down direction, and the folded portion is folded to be arranged between the seat frame and the superposed portion in the vehicle-widthwise direction.

The folded portion is preferably configured to be capable of pushing out the superposed portion toward the vehicle component in the vehicle-widthwise direction upon receiving reaction force from the seat frame during deployment and inflation of the side airbag.

A vehicle side airbag device according to the present invention includes a side airbag provided inside a vehicle seat and allowed to be deployed and inflated from the seat into between an occupant and a vehicle component positioned laterally to the occupant in a vehicle-widthwise direction and an inflator attachable to a seat frame of the seat and causing inflator gas to be introduced into the side airbag. The inflator is stored inside the side airbag near a rear end thereof in a deployment and inflation direction, in a spread state, the side airbag has a folded portion with a folding line and a superposed portion in series sequentially from a side of the inflator to a front end thereof in the deployment and inflation direction, in a stored state before deployment. The folded portion is formed to include an abutment portion folded back to a vehicle rear side from a vehicle front side and abutted against the seat frame during attachment to the seat on a front side of the inflator in a vehicle front-back direction. The superposed portion is formed to be superposed in a rolled state or folded in a bellows-like state to have an upper part wider than a lower part in an up-down direction, and the folded portion is folded to be arranged between the seat frame and the superposed portion in the vehicle-widthwise direction.

The folded portion is preferably configured to be capable of pushing out the superposed portion toward the vehicle component in the vehicle-widthwise direction upon receiving reaction force from the seat frame during deployment and inflation of the side airbag.

The vehicle component is desirably a vehicle door or a console box provided on a center side in the vehicle in the vehicle-widthwise direction.

The side airbag is preferably folded to have an upper part in the up-down direction placed on a lower part before the folded portion and the superposed portion are formed.

Desirably, the side airbag has an additional folded portion with an additional folding line between the folded portion and the superposed portion. In a stored state before deployment, the additional folded portion is formed to be folded back at least once along the additional folding line to the vehicle rear side from the vehicle front side or conversely in an arrangement parallel to the folded portion; and the superposed portion is arranged between the additional folded portion and the folded portion in the vehicle-widthwise direction.

In the vehicle side airbag device according to the present invention, the movement of a deployed and inflated side airbag to jerk up the arm of an occupant can be reduced or alleviated and the occupant restraining performance can be improved.

BRIEF DESCRIPTION OF THE DRAWINGS

FIGS. 8(a-e) are schematic views for illustrating the second half of the assembling procedure described above.

FIG. 17 is a view for illustrating a second stage of the procedure of assembling the side airbag shown in FIG. 16.

FIG. 18 is a view for illustrating a third stage of the procedure of assembling the side airbag shown in FIG. 16.

DETAILED DESCRIPTION

Hereinbelow, a vehicle side airbag device according to a preferred embodiment of the present invention will be described in detail with reference to the accompanying drawings.

Figure 1:
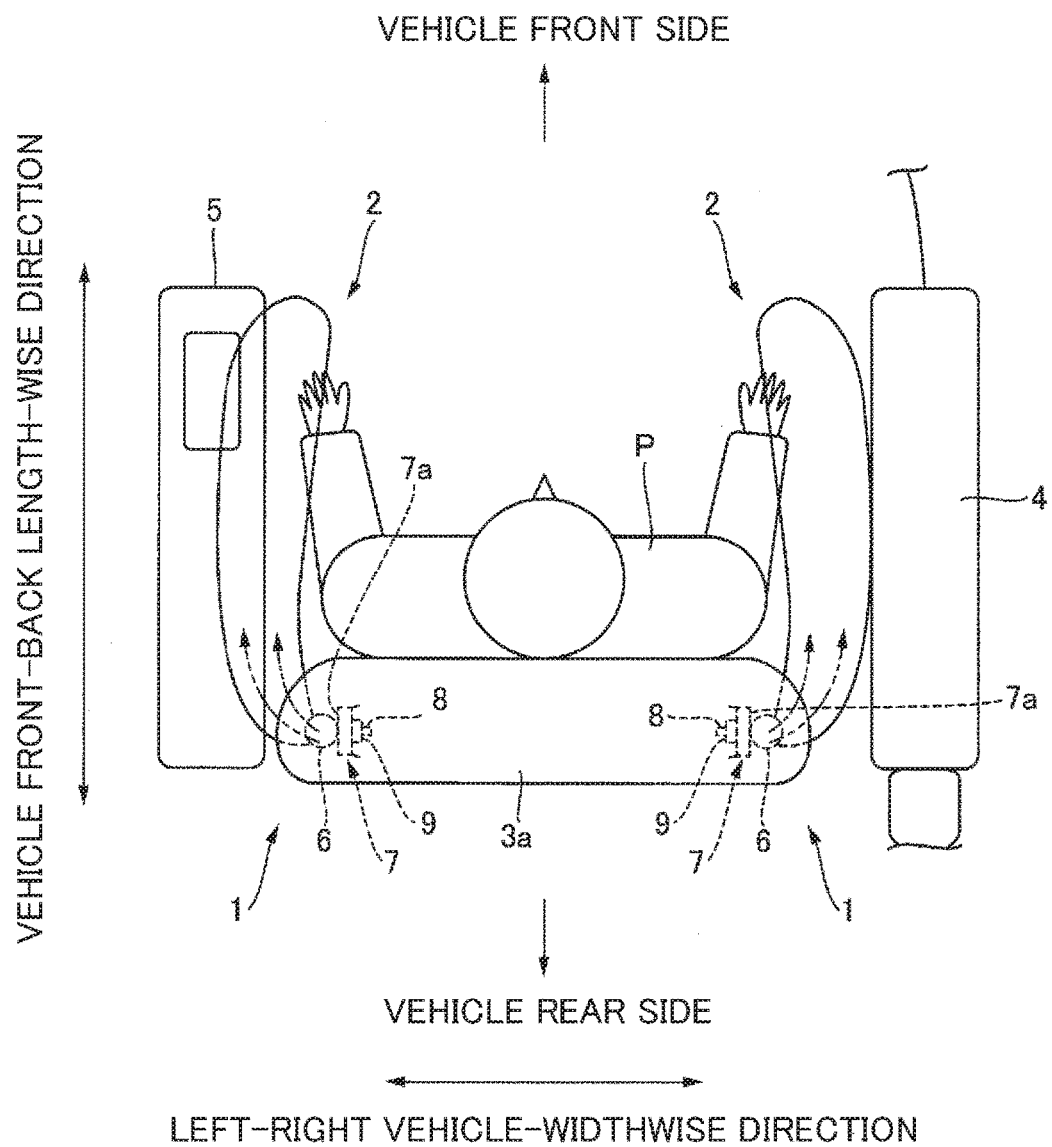
FIG. 1 is a plan view of a vehicle side airbag device according to a preferred embodiment of the present invention showing from above a side airbag in an inflated and deployed state.

As shown in FIG. 1, a side airbag 2 in a vehicle side airbag device 1 is provided inside a seat back 3a of a seat 3 provided in a vehicle as the airbag is stored in a rolled up or collapsed state before deployment and inflation. An occupant P is seated at the seat 3. On both the left and right sides of the seat 3 in the vehicle-widthwise direction, vehicle components such as a door 4 (on the vehicle exterior side) and a console box 5 (on the vehicle interior side) on the center side in the vehicle-widthwise direction are provided in lateral positions to the occupant P in the vehicle-widthwise direction, in other words, in positions facing the sides of the occupant P.

Figure 2:
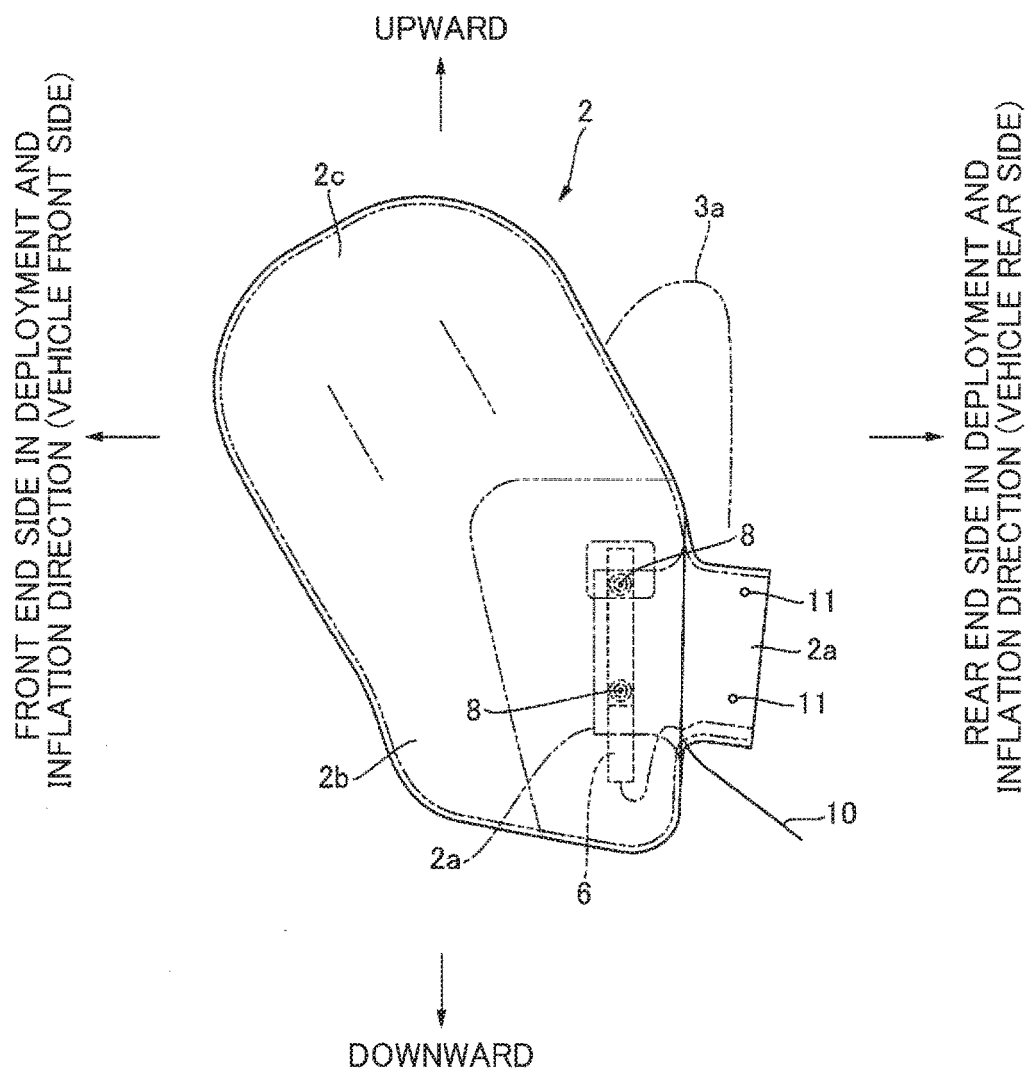
FIG. 2 is a view for illustrating a first stage of the assembling procedure of assembling a side airbag into a stored state.

As has been well known, in response to an impact upon the vehicle caused by a side collision for example, the side airbag 2 is deployable and inflatable from the seat back 3a to the front side of the seat 3, in other words, forward in the front-back lengthwise direction of the vehicle (hereinafter as the vehicle front-back direction), into between the occupant P and the vehicle component such as the door 4 and the console box 5 positioned laterally to the occupant P in the vehicle-widthwise direction. Therefore, as shown in FIG. 2, the part of the side airbag 2 on the side of the seat back 3a (the vehicle rear side) corresponds to the rear end side in the deployment and inflation direction, and the vehicle front side corresponds to the front end side in the deployment and inflation direction.

The deployment and inflation of the side airbag 2 from its stored state is achieved by introduction of inflator gas from an inflator 6 into the side airbag 2. The side airbag 2 is normally deployed and inflated in a range from the hips of the occupant P to above the head, restrains the occupant P toward the seat 3, blocks the vehicle component such as the door 4 from the occupant P to protect the occupant P, and reduces the injury value for the occupant P.

Figure 9:
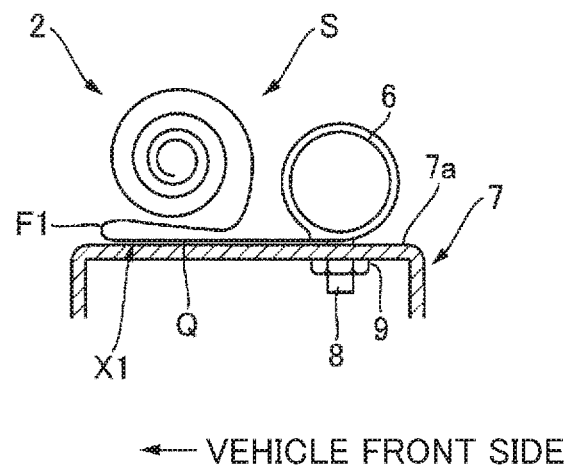
FIG. 9 is a plan view of the side airbag (rolled type) shown in FIG. 1 in a stored state before deployment showing from above how the side airbag is attached to a seat frame.

A seat frame 7 for receiving and supporting the body of the occupant P or the like resting thereupon is provided in the seat back 3a. As shown in FIG. 9, the seat frame 7 is a frame including a channel member or a square tube. The seat frame 7 has a plane portion facing the side of the vehicle component such as the door 4, and according to the embodiment, the plane portion forms a support surface 7a used to attach the inflator 6 or support the side airbag 2 to be deployed and inflated. Therefore, the inflator 6 can be attached to the seat 3, for example at the seat frame 7.

Stud bolts 8 are provided integrally on one side of the inflator 6 and fixed by nuts 9 to the support surface 7a of the seat frame 7 inside the seat back 3a. The inflator 6 is attached to the support surface 7a of the seat frame 7 as the stud bolts 8 are fixed to the seat frame 7. The inflator 6 is stored in the side airbag 2. The storing position of the inflator 6 is set near the rear end of the side airbag 2 in the deployment and inflation direction.

The inflator 6 stored in the side airbag 2 is attached to the seat frame 7, so that the part of the side airbag 2 near the rear end in the deployment and inflation direction is fixed to the seat frame 7. Since the inflator 6 is stored in the side airbag 2, inflator gas ejected from the inflator 6 fills up the side airbag 2 to deploy and inflate the side airbag 2.

Now, the assembling procedure of assembling the side airbag 2 into a stored state will be described. FIG. 2 shows the side airbag 2 in a flat spread out state. In the figure, the upward direction corresponds to the upward direction in the vehicle up-down height-wise direction (hereinafter referred to as the height-wise direction), the downward direction corresponds to the downward direction in the height-wise direction, the leftward corresponds to the front end side in the deployment and inflation direction (the vehicle front side), and the rightward corresponds to the rear end side in the deployment and inflation direction (the vehicle rear side).

In a well-known manner, the side airbag 2 is formed into a bag shape having an opening portion 2a by placing two sheets of ground (base) fabric on each other or folding a sheet of ground fabric and placing the folds upon each other and then stitching the peripheries together to join them.

In the illustrated side airbag 2, the opening portion 2a is formed to protrude to the vehicle rear side toward the rear end in the deployment and inflation direction (hereinafter referred to as the rear end in the deployment direction). The inflator 6 is stored inside the side airbag 2 through the opening portion 2a. The stud bolts 8 protrude outwardly from the side airbag 2 through bolt holes formed at the side airbag 2. Note that 10 designates a wiring harness.

According to the embodiment, the external shape of the side airbag 2 has a larger size in the vehicle up-down direction than its length in the vehicle front-back direction. The side airbag 2 is generally directed obliquely upward from the storing position of the inflator 6 to the front side in the vehicle front-back direction.

Stated differently, when the side airbag 2 is observed as it is separated in the height-wise direction into a lower part 2b corresponding to a height-wise range in which the inflator 6 is stored (which corresponds to the height of the door belt line and its vicinity in the vehicle) and an upper part 2c corresponding to a height-wise range beyond the inflator 6 (which corresponds to the side window position in the vehicle), the upper part 2c is formed to be directed obliquely upward to the front side in the vehicle front-back direction.

If the side airbag 2 is formed into this shape, the region from the hips to the head of the occupant P that can move forward in the vehicle and outward in the vehicle-widthwise direction upon a side collision or the like can be received and restrained by the entire side airbag 2 and protected.

Figure 3:
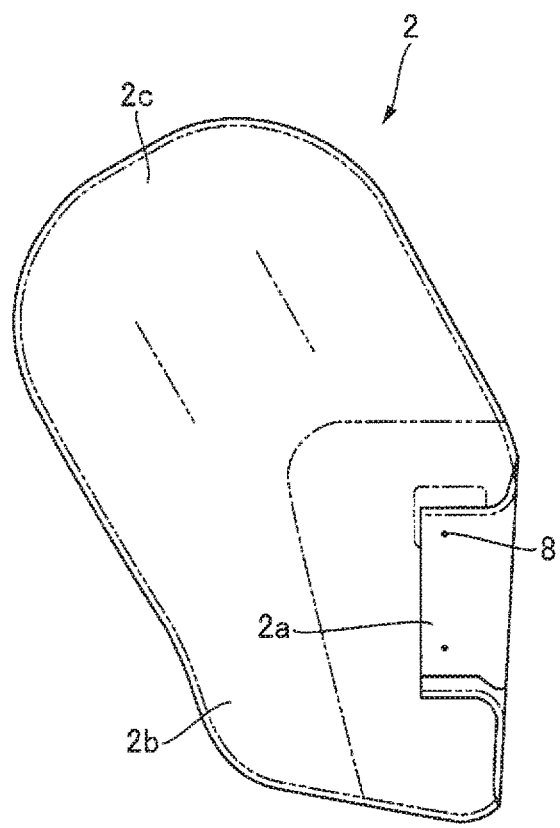
FIG. 3 is a view for illustrating a second stage of the assembling procedure.

Then, as shown in FIG. 3, the opening portion 2a of the side airbag 2 is folded back to the front end in the deployment and inflation direction (hereinafter referred to as the front end in the deployment direction) and is partly placed on the lower part 2b of the side airbag 2 so that the opening portion overlaps the storing position of the inflator 6. The opening portion 2a has through holes 11 through which the stud bolts 8 protruding from the side airbag 2 are passed (see FIG. 2). Therefore, the opening portion 2a is placed on the lower part 2b of the side airbag 2 to face the support surface 7a of the seat frame 7.

Figure 4:
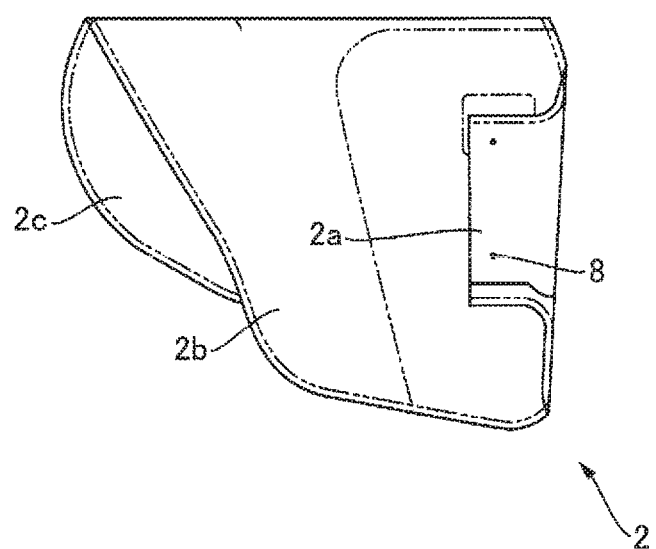
FIG. 4 is a view for illustrating a third stage of the assembling procedure.

Then, as shown in FIG. 4, the side airbag 2 is folded downward so that the upper part 2c is placed on the lower part 2b. In the illustrated example, the upper part 2c is placed on the lower part 2b of the side airbag 2 on the opposite side to the side to which the opening portion 2a is folded, in other words, the upper part is placed to face the vehicle component such as the door 4 and the console box 5. In this way, the side airbag 2 in an external shape having a larger size in the height-wise direction can be stored in a compact shape with a reduced height.

Figure 5:
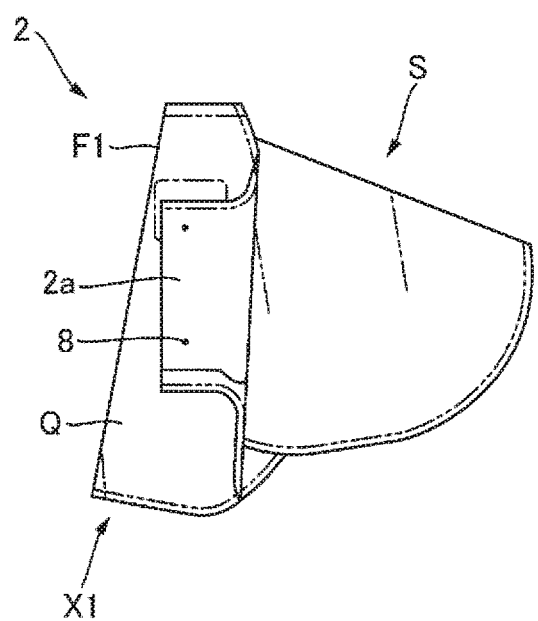
FIG. 5 is a view for illustrating a fourth stage of the assembling procedure.

Then, as shown in FIG. 5, the part of the side airbag 2 on the vehicle front side ahead of the storing position of the inflator 6 (the part to be the front end in the deployment and inflation direction) is folded back to the vehicle rear side (the rear end side in the deployment and inflation direction) along a folding line F1 set at the front end of the front extended part extended to the vehicle front side beyond the stored position of the inflator 6. An abutment portion Q in abutment against the support surface 7a of the seat frame 7 is set at the extended portion from the stored position of the inflator 6 to the folding line F1 on the vehicle front side of the inflator 6 in the vehicle front-back direction.

For the ease of description, the description will continue with reference to FIGS. 7(a)-(c) and FIGS. 8(a)-(e) showing the side airbag 2 in a rectangular shape having a greater length in the vehicle front-back direction. FIG. 7(a) substantially corresponds to FIG. 2 and FIG. 3 and shows the side airbag 2 storing the inflator 6 in a flat spread out state. In the following description, the manner of folding the upper part 2c of the side airbag 2 on the lower part 2b described in conjunction with FIG. 4 is omitted.

In the flat spread out state, the side airbag 2 has a folded portion X1 with a folding line F1 and a superposed portion S rolled or folded in a bellows-like shape in series sequentially from the side of the inflator 6 (on the rear end side in the deployment direction) to the front end in the deployment direction.

To be more specific, the folded portion X1 corresponds to a region folded along the folding line F1 at the front end of the front extended portion from the stored position of the inflator 6, and the front extended portion that forms the folded portion X1 includes the abutment portion Q in abutment against the seat frame 7 or the support surface 7a of the seat frame 7 to be specific when the side airbag 2 is attached to the seat 3.

Figure 7:
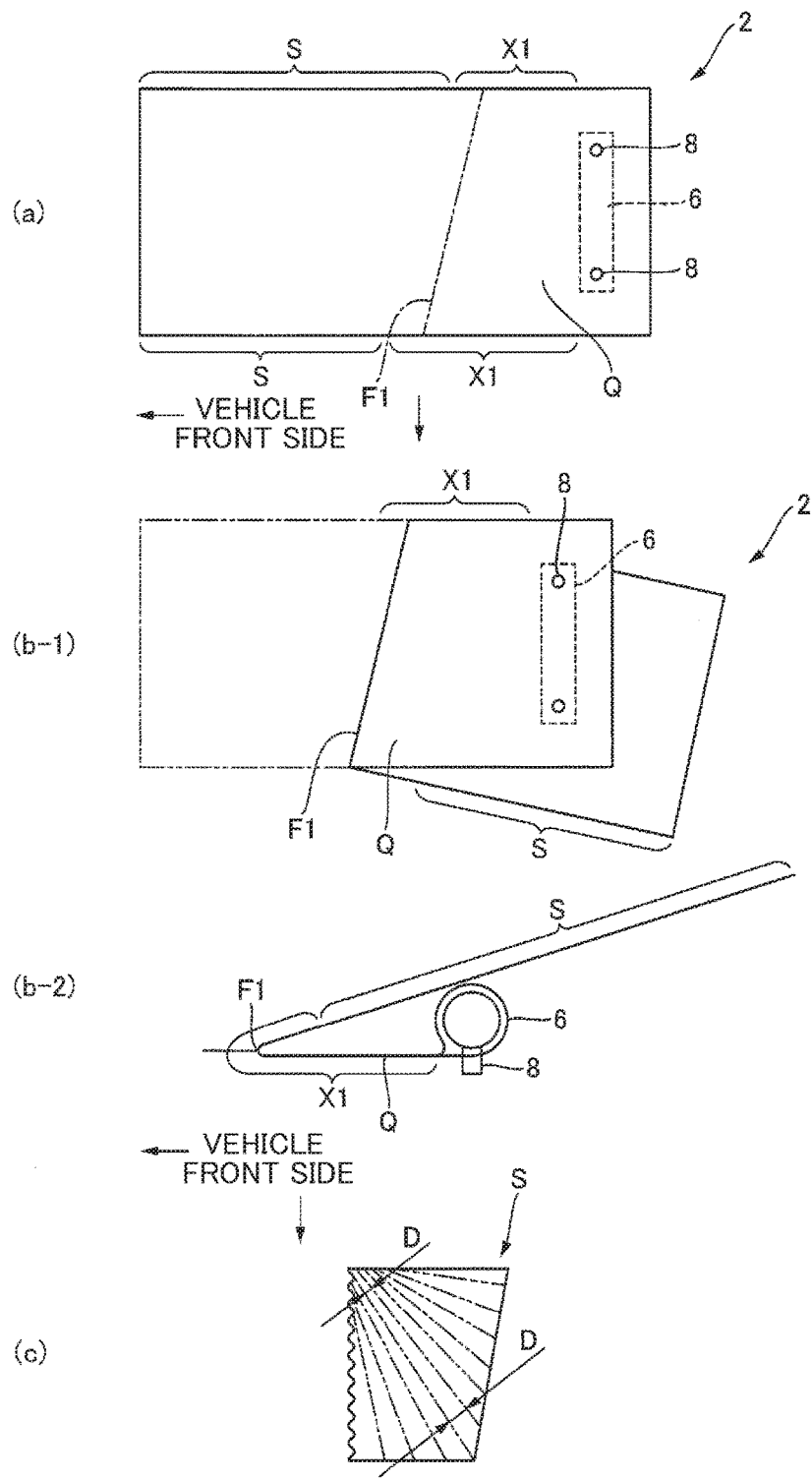
FIGS. 7(a, b-1,b-2 and c) are schematic views for illustrating the first half of the assembling procedure described above.

FIG. 7(b-1) corresponds to FIG. 5. As described in conjunction with FIG. 5, the position of the folding line F1 is set on the vehicle front side ahead of the stored position of the inflator 6. In the illustrated example of the side airbag 2, the airbag is folded back to the vehicle rear side from the vehicle front side along the folding line F1 on the front side of the inflator 6 in the vehicle front-back direction, so that the entire side airbag is extended to the rear side of the vehicle excluding the abutment portion Q.

The folded portion X1 is provided in a location between the support surface 7a of the seat frame 7 and the vehicle component such as the door 4 and the console box 5. In the meantime, the superposed portion S is extended on the vehicle rear side behind the folded portion X1 by the folding line F1. When the folding line F1 is set on the vehicle rear side behind the storing position of the inflator 6 and the side airbag 2 is folded to the vehicle front side from the vehicle rear side, the superposed portion S is extended to the vehicle front side ahead of the folded portion X1.

In the illustrated example, the folding line F1 is formed slightly obliquely with respect to the vehicle front-back direction so that the upper end side of the side airbag 2 in the height-wise direction is folded in a position more on the vehicle rear side and the lower end side in the height-wise direction is folded in a position more on the vehicle front side. In this way, the superposed portion S has a substantially trapezoidal outer shape.

When the folded side airbag 2 is observed from above, the superposed portion S continuous with the folded portion X1 is positioned to overlap the inflator 6 in the side airbag 2 as shown in FIG. 7(b-2).

The superposed portion S is superposed in a rolled state or folded in a bellows-like state. As shown in FIG. 7(c), as for the shape of the superposed portion S, the circumference D for taking up or the interval D for folding is reduced on the upper side of the side airbag 2 and widened on the lower side so that the lower side of the side airbag 2 in the height-wise direction is wider than the upper side during superposition.

Therefore, as shown in FIG. 8(a), when the side airbag 2 is in a stored state after the superposed portion S is formed, the superposed portion S is placed on the abutment portion Q of the folded portion X1 in the vehicle-widthwise direction, while as shown in FIG. 8(b), when the superposed portion S is in a rolled state, the upper side has a small radius (R1), and the lower side is loosely rolled to have a large radius (R2) as shown in FIG. 8(c) and FIG. 8(d), so that the side airbag is formed into a circular truncated cone (cone shape) tapered upward and made longer in the vertical direction. As can be understood from the stored state, the side airbag 2 has, in series, an extended portion extended generally flatly from the stored position of the inflator 6 and including the abutment portion Q, the folding line F1 at the front end of the extended portion, and the superposed portion S extended from the folding line F1 to the front end in the deployment and inflation direction, so that the superposed portion S is placed on the extended portion (abutment portion Q) by the folding line F1 virtually along the folding line F1 as the boundary.

When the superposed portion S is folded in a bellows-like shape, the upper side is narrow (W1) and the lower side is wide (W2) as shown in FIG. 8(e), so that the portion is formed into a trapezoidal shape tapered upward and made longer in the vertical direction.

When the length from the inflator 6 to the folding line F1 is shorter than the above-described larger sizes (R2 and W2) of the superposed portion S and the folded portion X1 is deployed and inflated, the superposed portion S might roll and fall off from the support surface 7a rather than in the vehicle-widthwise direction. Therefore, the length from the inflator 6 to the folding line F1 is preferably set to about the same size as the above-described sizes (R2 and W2) of the superposed portion S.

Figure 6:
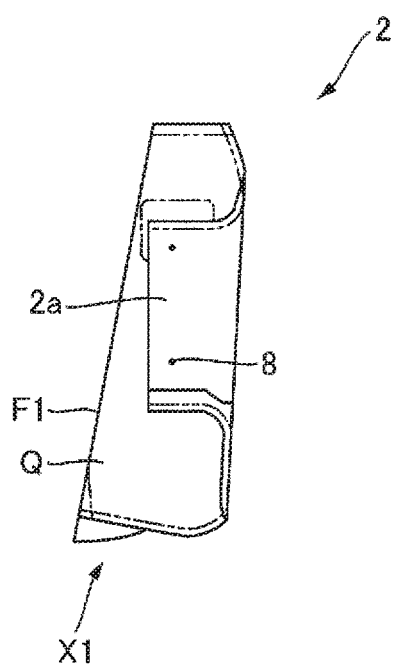
FIG. 6 is a view for illustrating a fifth stage of the assembling procedure.

As in the foregoing, the side airbag 2 is arranged in the stored state as shown in FIG. 6 that corresponds to FIG. 8(a). The superposed portion S that is wider on the lower side (which is loosely rolled or widely folded) than the upper side allows the lower side of the side airbag 2 to be smoothly and swiftly deployed from the seat back 3a toward the vehicle front side during deployment and inflation of the side airbag 2, so that the upper side of the superposed portion S is unfolded by the deployment of the lower side of the side airbag 2, immediately followed by deployment of the upper side of the side airbag 2.

Figure 10:
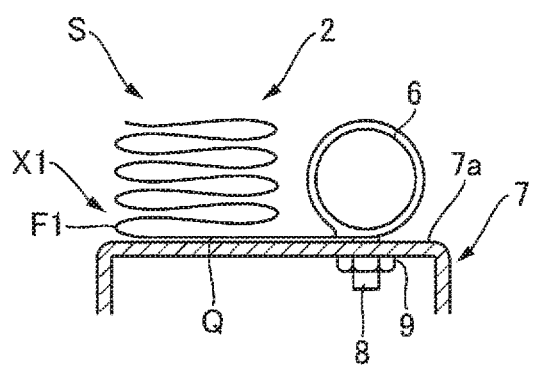
FIG. 10 is a plan view of the side airbag (bellows-like type) shown in FIG. 1 in a stored state before deployment showing from above how the side airbag is attached to the seat frame.

As shown in FIG. 9 and FIG. 10, the side airbag 2 in the stored state is provided in the seat back 3a by fixing the stud bolts 8 of the inflator 6 to the seat frame 7 and attaching the inflator 6 to the seat frame 7. In the stored state of the side airbag 2 having the inflator 6 provided inside, the folded portion X1 is arranged between the support surface 7a of the seat frame 7 and the superposed portion S while it is directed in the vehicle-widthwise direction in which the vehicle component such as the door 4 and the console box 5 is positioned. More specifically, the folded portion X1 is folded to be arranged between the seat frame 7 and the superposed portion S in the vehicle-widthwise direction.

The folded portion X1 is configured to be capable of pushing out the superposed portion S toward the vehicle component such as the door 4 and the console box 5 in the vehicle-widthwise direction upon receiving reaction force from the seat frame 7 during deployment and inflation of the side airbag 2. Stated differently, the folded portion X1 is configured to be inflated at the support surface 7a of the seat frame 7 by introduced inflator gas and push out the superposed portion S toward the vehicle component such as the door 4 and the console box 5 in the vehicle-widthwise direction.

Now, the operation of the vehicle side airbag device 1 according to the embodiment will be described. The following description is about the operation on the side of the door 4 but equally applies to the operation on the side of the console box 5.

Figure 11:
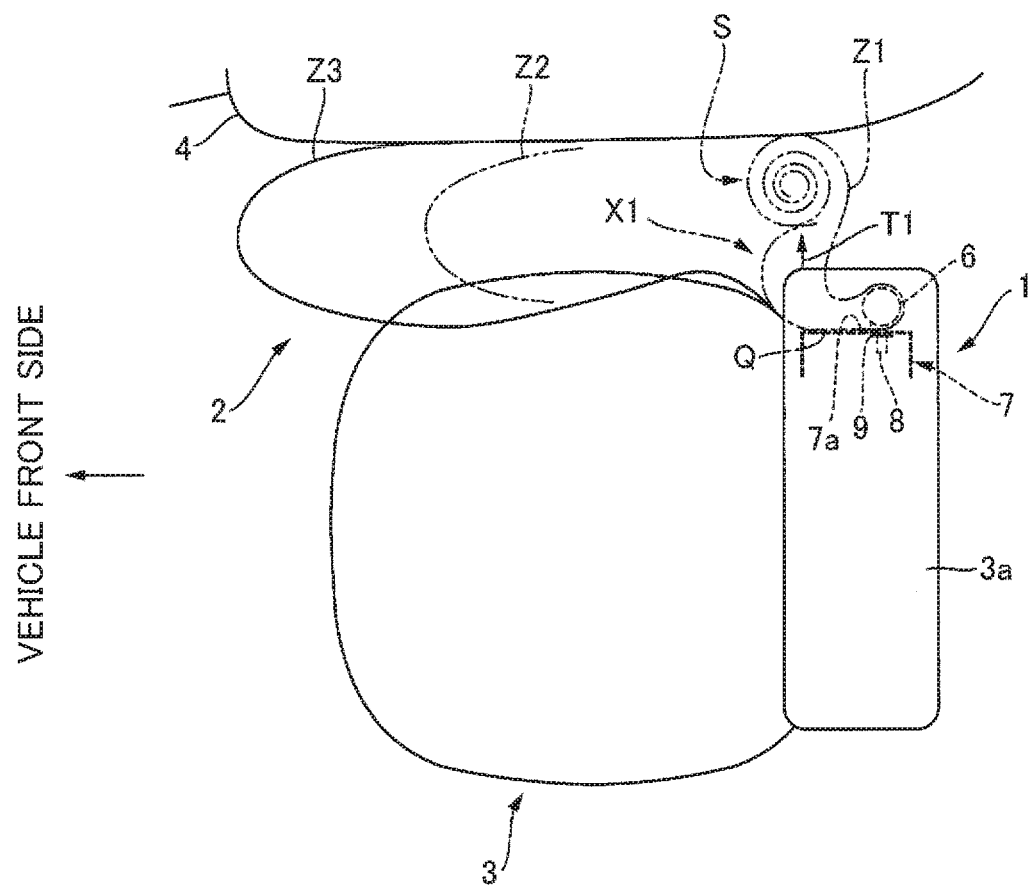
FIG. 11 is a view for illustrating how the side airbag shown in FIG. 1 is inflated and deployed as viewed from above.
Figure 12:
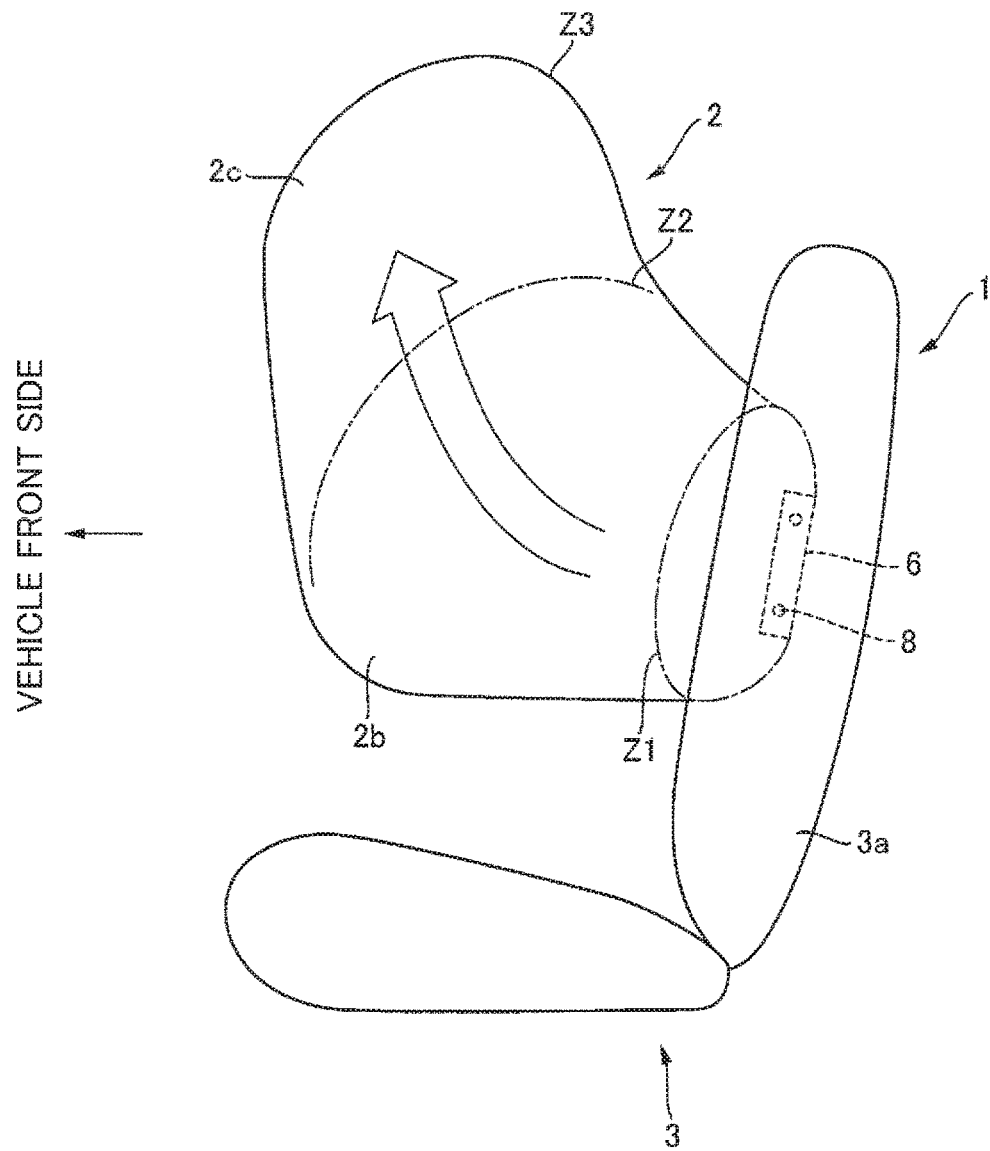
FIG. 12 is a view for illustrating the process of the deployment and inflation of the side airbag shown in FIG. 11 as viewed from the side.

As shown in FIG. 11 and FIG. 12, the side airbag 2 that stores the inflator 6 attached to the support surface 7a of the seat frame 7 using the stud bolts 8 is provided in a stored state inside the seat back 3a. The inflator 6 is activated in response to a side collision for example to eject inflator gas into the side airbag 2, and then the side airbag 2 is made to jump out through the opening formed at the seat back 3a and deployed and inflated.

In an initial stage of the deployment and inflation of the side airbag 2, the folded portion X1 folded along the folding line F1 is filled up with the inflator gas. The folded portion X1 has the abutment portion Q placed on the support surface 7a of the seat frame 7 and is inflated in the vehicle-widthwise direction or toward the side of the door 4 as the vehicle component as the portion bears on the support surface 7a during inflation.

The folded portion X1 is also positioned between the support surface 7a of the seat frame 7 and the superposed portion S in the vehicle-widthwise direction, and therefore the folded portion X1 inflated toward the door 4 as indicated by the single-dot chain line Z1 pushes out the superposed portion S toward the door 4 (see the arrow T1).

The inflator gas introduced into the folded portion X1 is further introduced into the superposed portion S. The superposed portion S is deployed and inflated by the introduced inflator gas while being pressed against the door 4 by the folded portion X1. The lower side of the side airbag 2 precedes the upper side of the side airbag 2 in the deployment and inflation of the superposed portion S because of the rolled or bellows-like superposed state.

The preceding lower side of the side airbag 2 is instantaneously deployed and inflated to the vehicle front side from the side of the seat back 3a along the door 4 while being pressed against the door 4 by the folded portion X1. As indicated by the two-dot chain line Z2, when the lower side of the side airbag 2 is deployed and inflated, the relatively tightly rolled or folded upper side of the superposed portion or the upper side of the side airbag 2 is unfolded in response to the movement to be deployed and inflated to the vehicle front side from the side of the seat back 3a as the inflator gas is introduced.

A shown in FIG. 4, when the upper part 2c of the side airbag 2 in the up-down direction is folded and placed on the lower part 2b before the folded portion X1 and the superposed portion S are formed, the upper part 2c is deployed and inflated more upward than the lower part 2b in the process of deployment and inflation of the superposed portion S.

Therefore, as indicated by the solid line Z3, the lower part 2b of the side airbag 2 is deployed and inflated facing the door 4 and the upper part 2c is directed obliquely upward during deployment and inflation so that the upper part 2c faces the side window or the like. The operation can be similarly ensured for the vehicle side airbag device 1 provided on the side of the console box 5.

As described in conjunction of the background art, as the side airbag 2 is deployed and inflated, the side airbag could enter below the arm of an occupant or the arm of an occupant could be unintendedly positioned above the side airbag, and the arm of the occupant could be violently and instantaneously jerked up by the side airbag.

In contrast, in the vehicle side airbag device 1 according to embodiment, the superposed portion S deployed and inflated to the vehicle front side is pushed out and pressed against the door 4 or the console box 5 by the folded portion X1, so that the superposed portion S can be deployed and inflated to the vehicle front side while avoiding the position of the arm of the occupant P.

Since the upper side of the side airbag 2 is gradually unfolded to be deployed and inflated from the rolled or bellows-like folded state succeeding the deployment and inflation of the lower side of the side airbag 2, so that the superposed portion S lifts up the arm of the occupant P rather than violently and instantaneously jerking up the arm of the occupant P and the side airbag 2 can be directed obliquely upward during deployment and inflation.

Therefore, appropriate occupant restraining performance can be ensured without placing an unwanted load upon the occupant P and bringing the occupant P into an unbalanced position. The side airbag 2 can be deployed and inflated in a height range from the hips of the occupant P to above the head and receive the chest and side of the occupant P from under the lifted arm to surely restrain the occupant P to the side of the seat 3, while at the same blocking and protecting the occupant P from the vehicle component such as the door 4 and the console box 5, so that the injury value for the occupant P can be reduced.

As in the foregoing, the vehicle side airbag device 1 according to the embodiment can alleviate and reduce the movement of the side airbag 2 to jerk up the arm of the occupant P during deployment and inflation, so that the occupant restraining performance can be improved.

Figure 13:
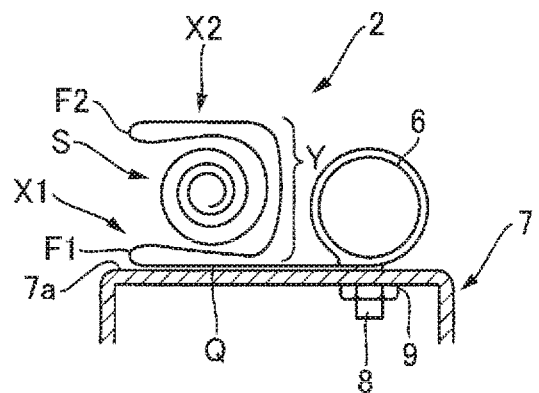
FIG. 13 is a plan view of a modification of the vehicle side airbag device according to the present invention showing from above a side airbag (rolled type) in a stored state before deployment and how the side airbag is attached to a seat frame.
Figure 14:
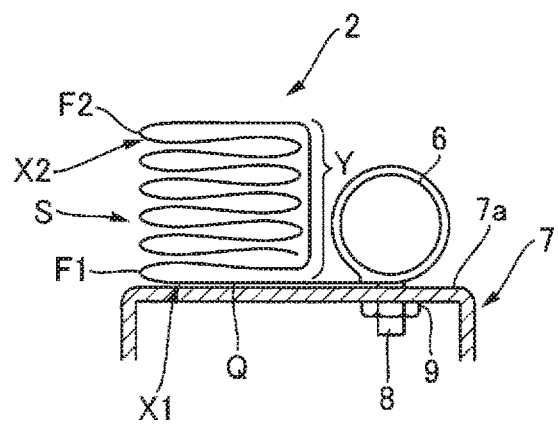
FIG. 14 is a plan view of the modification of the vehicle side airbag device according to the present invention showing from above a side airbag (bellows-like type) in a stored state before deployment and how the side airbag is attached to a seat frame.
Figure 15:
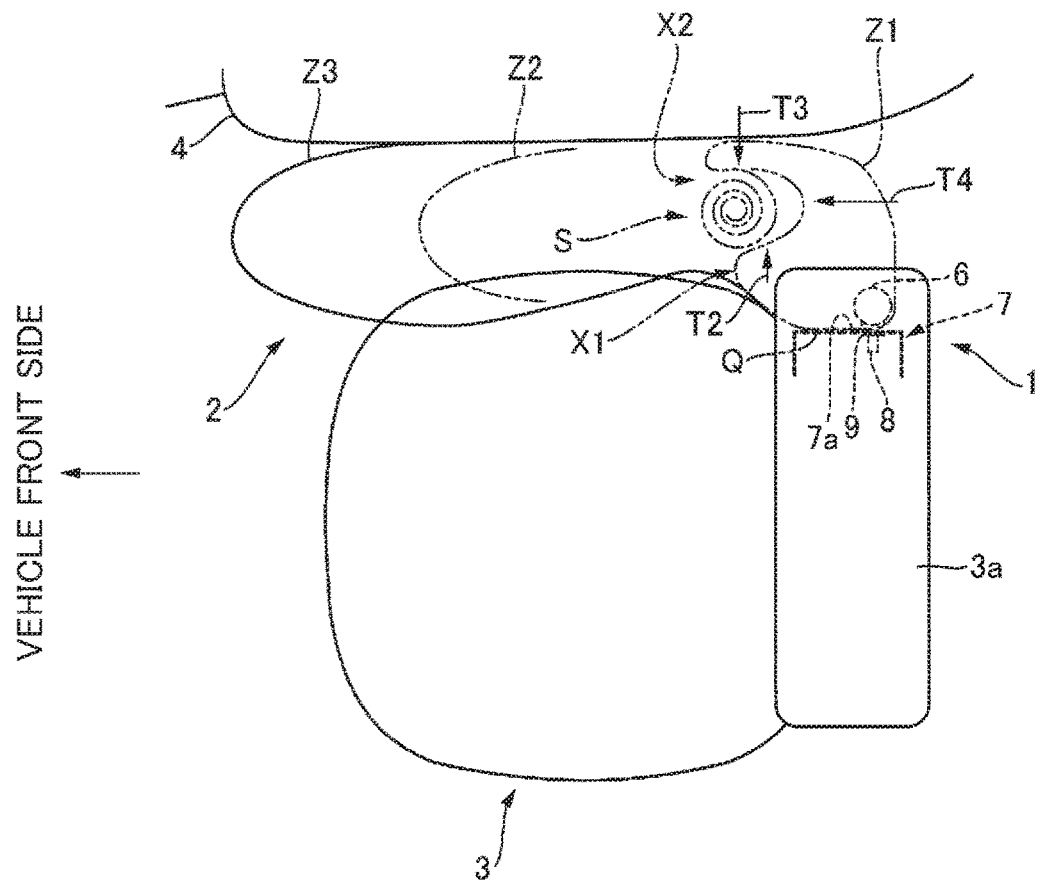
FIG. 15 is a view for illustrating how the side airbag in the modification of the vehicle side airbag device according to the present invention is deployed and inflated as viewed from above.

FIG. 13 to FIG. 15 show a modification of the above-described embodiment. FIG. 13 is a view of a side airbag (rolled type) according to the modification in a stored state before deployment showing from above how the side airbag is attached to a seat frame, FIG. 14 a view of a side airbag (bellows-like type) according to the modification in a stored state before deployment showing from above how the side airbag is attached to a seat frame, and FIG. 15 is a view of the side airbag according to the modification showing from above how the side airbag is deployed and inflated.

As shown in FIGS. 13 and 14, according to the modification, the side airbag 2 has a folded portion X1, an additional folded portion X2 with an additional folding line F2, and a superposed portion S in series sequentially from the side of the inflator 6 to its front end in a flat spread out state. More specifically, the additional folded portion X2 is provided between the folded portion X1 and the superposed portion S.

The superposed portion S is arranged between the additional folded portion X2 and the folded portion X1 in the vehicle-widthwise direction in the stored state before deployment because of the additional folded portion X2. More specifically, the additional folded portion X2 is positioned outside of the superposed portion S in the vehicle-widthwise direction. The additional folded portion X2 faces the vehicle component such as the door 4 and the console box 5.

The superposed portion S is interposed between the additional folded portion X2 and the folded portion X1, and the additional folded portion is inflated by inflator gas introduced through the folded portion X1, supports the superposed portion S to be pushed out in the vehicle-widthwise direction by the inflation of the folded portion X1 from the opposite side (on the side of the door 4 or the console box 5) to the folded portion X1 (on the side of the inflator 6 and the seat frame 7) and thus directs the deployment and inflation direction of the superposed portion S laterally to the occupant P.

The additional folded portion X2 is formed by setting the additional folding line F2 in a location of the superposed portion S connected to the folded portion X1. The additional folding line F2 causes the direction of rolling or folding the superposed portion S to be reversed from the above-described embodiment (see FIG. 9 and FIG. 10). The additional folded portion X2 is continuous to both the superposed portion S and the folded portion X1 as described above and connected to the folded portion X1 by detouring to surround almost half around the outer side of the superposed portion S from the vehicle rear side (indicated by Y).

The folding line F1 of the folded portion X1 and the additional folding line F2 of the additional folded portion X2 are set on the same side with respect to the inflator 6 in the vehicle front-back direction. The additional folded portion X2 and the folded portion X1 are set in a parallel arrangement to each other in the vehicle front-back direction.

The additional folded portion X2 may be folded to the opposite direction from the above or forward from the vehicle rear side to be specific if the superposed portion S is positioned between the additional folded portion X2 and the folded portion X1. In the illustrated example, the additional folded portion X2 is folded once but a plurality of such additional folded portion X2 may be formed by folding back a number of times, so that the plurality of additional folds X2 are placed upon one another.

The additional folded portion X2 is positioned parallel to the support surface 7a of the seat frame 7 and provided in a position between the inflator 6 or the folded portion X1 and the vehicle component such as the door 4 and the console box 5.

As indicated by the dot-dash chain line Z1 in FIG. 15, in an early stage of the deployment and inflation of the side airbag 2, the folded portion X1 is inflated by inflator gas filled up inside and pushes out the superposed portion S and the additional folded portion X2 toward the door 4 (see the arrow T2). The inflator gas from the folded portion X1 is further introduced into the additional folded portion X2 through the folded portion X1, and the additional folded portion X2 is inflated.

The additional folded portion X2 is placed on the vehicle component such as the door 4 and the console box 5 and inflated in the vehicle widthwise direction or toward the support surface 7*a* of the seat frame 7 (toward the seat back 3*a*) by bearing on the vehicle component during inflation. The additional folded portion X2 is also arranged between the vehicle component (4, 5) and the superposed portion S in the vehicle widthwise direction, so that the additional folded portion X2 inflated toward the support surface 7*a* of the seat frame 7 presses the superposed portion S toward the support surface 7*a* of the seat frame 7 (see the arrow T3).

Furthermore, the additional folded portion X2 is connected to the folded portion X1 by detouring to surround the superposed portion S from the vehicle rear side and inflated by distribution of the inflator gas, so that the superposed portion S is pushed out toward the vehicle front side from between the folded portion X1 and the additional folded portion X2 (see the arrow T4).

In the modification, the additional folded portion X2 allows the superposed portion S to be appropriately guided toward the vehicle front side in the deployment and inflation direction. The entire side airbag 2 can be deployed and inflated more closely to the occupant P than the case of providing the folded portion X1 only, so that the effect of receiving the occupant P can be improved. The effect can be equally ensured for the vehicle side airbag device 1 provided on the side of the console box 5.

Then, when the inflator gas is introduced into the superposed portion S from the additional folded portion X2, the lower side of the side airbag 2 is deployed and inflated as indicated by the two-dot chain line Z2, and the relatively tightly rolled or folded upper side of the superposed portion or the upper side of the side airbag 2 is unfolded following the above-described movement and deployed and inflated toward the vehicle front side from the side of seat back 3*a* as the inflator gas is introduced.

Then, as indicated by the solid line Z3, the lower part 2*b* of the side airbag 2 is deployed and inflated facing the door 4, and the upper part 2*c* is directed obliquely upward facing the side window or the like to be deployed and inflated similarly to the above-described embodiment. It is understood that even in the modification, the advantageous effects equal to the above-described embodiments are provided.

Figure 16:
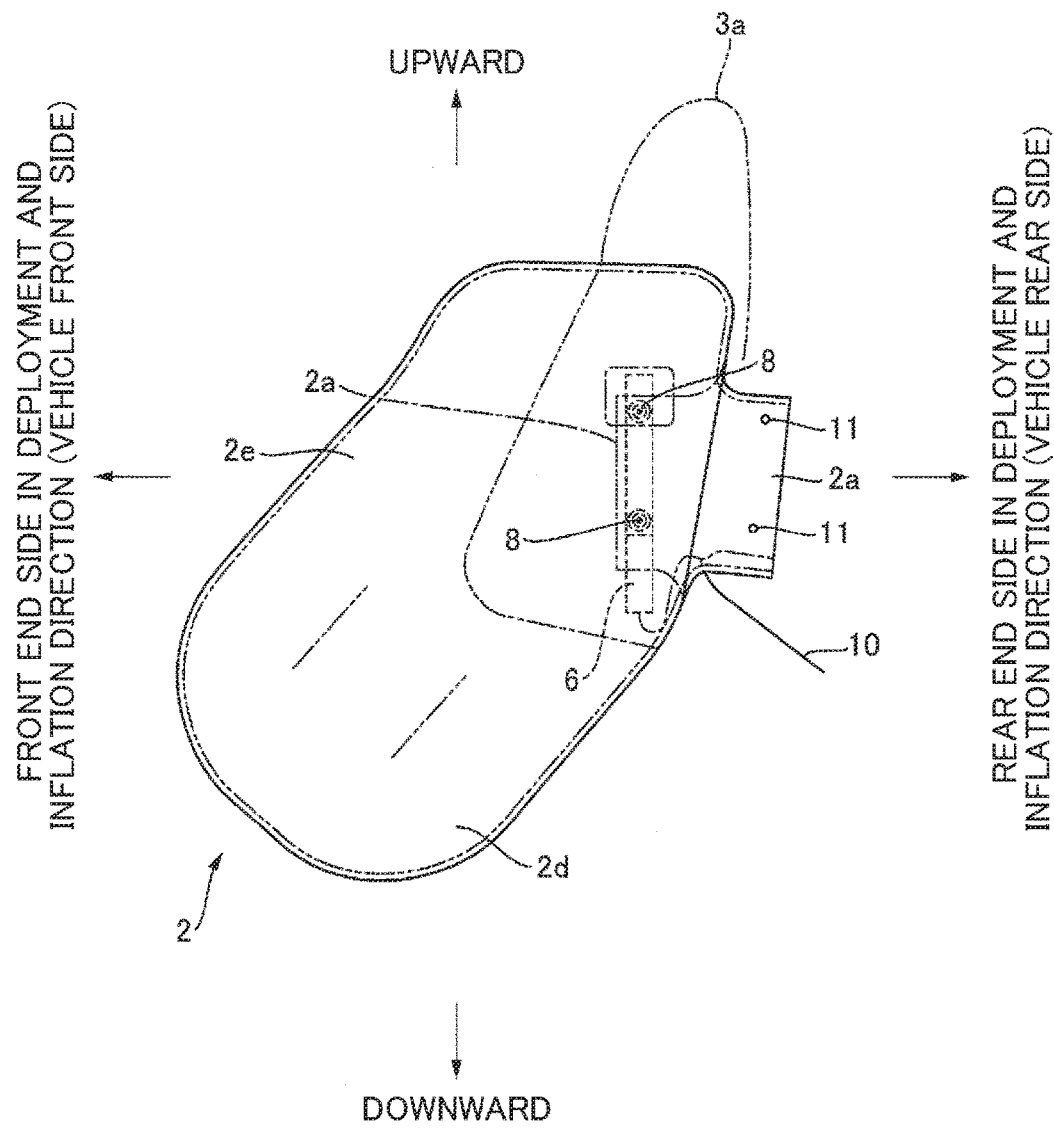
FIG. 16 is a view of another modification of the vehicle side airbag according to the present invention for illustrating a first stage of the assembling procedure of assembling a side airbag into a stored state.
Figure 19:
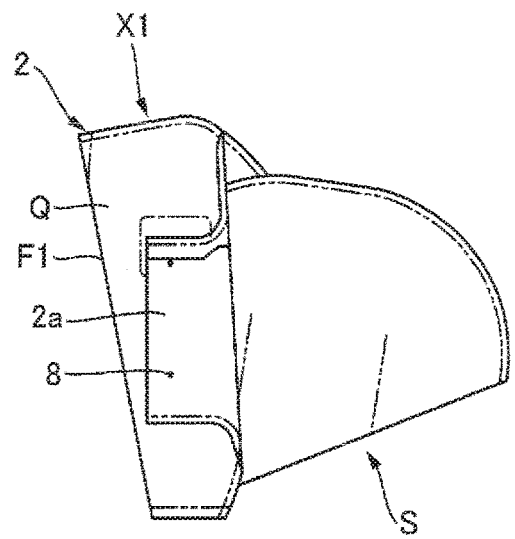
FIG. 19 is a view for illustrating a fourth stage of the procedure of assembling the side airbag shown in FIG. 16.
Figure 20:
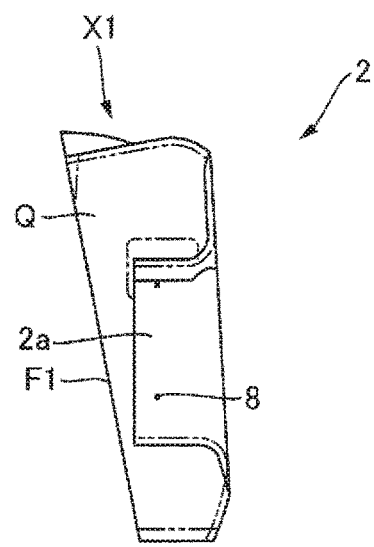
FIG. 20 is a view for illustrating a fifth stage of the procedure of assembling the side airbag shown in FIG. 16.
Figure 21:
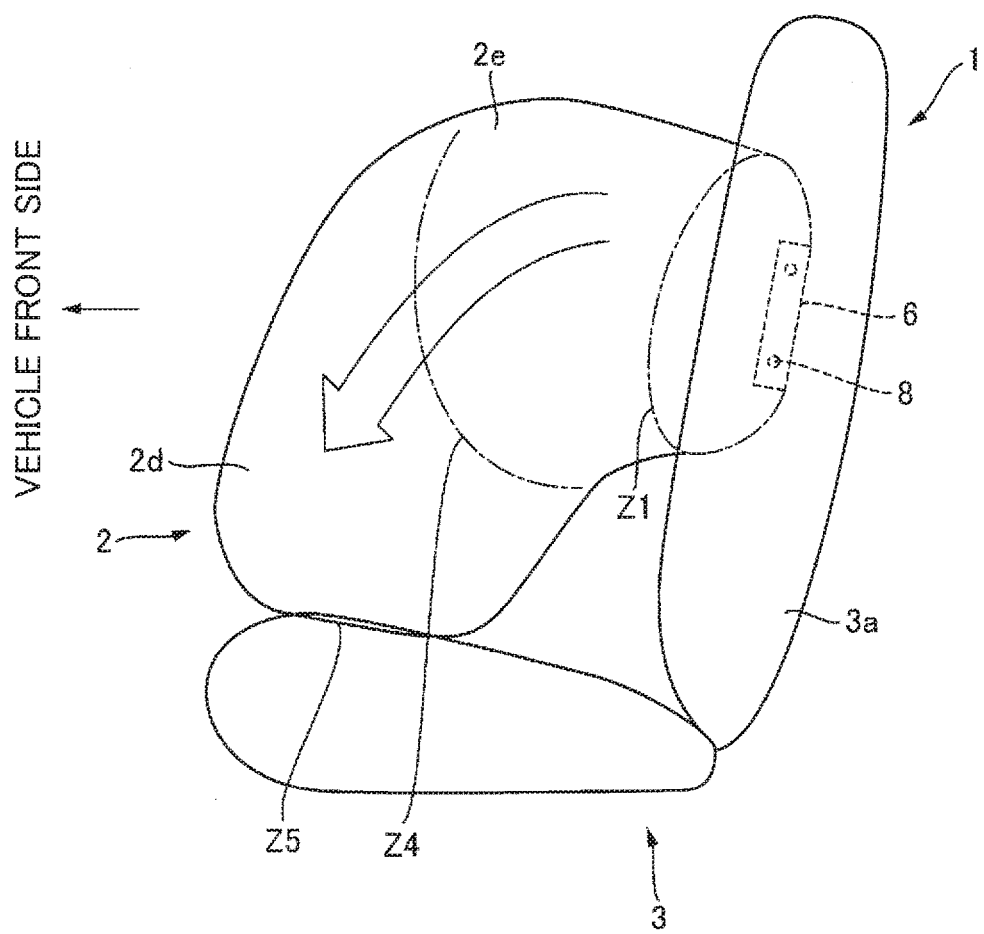
FIG. 21 is a view of the side airbag in FIG. 16 in the process of deployment and inflation as viewed from the side.

FIG. 16 to FIG. 21 show a side airbag device according to a modification of the embodiment of the present invention. FIG. 16 is a view for illustrating a first stage of the assembling procedure of assembling a side airbag into a stored state, FIG. 17 is a view for illustrating a second stage of the assembling procedure, FIG. 18 is a view for illustrating a third stage of the assembling procedure, FIG. 19 is a view for illustrating a fourth stage of the assembling procedure, FIG. 20 is a view for illustrating a fifth stage of the assembling procedure, and FIG. 21 is a view for illustrating the process of how the side airbag according to the modification is deployed and inflated as viewed from the side.

The following description will center on differences from the above-described embodiment.

According to the modification, the side airbag 2 has its upper part 2*e* deployed and inflated around the side window and the door 4 as indicated by the solid line Z5 in FIG. 21, and its lower part 2*d* directed obliquely downward to face the door 4 below the side window and to be deployed and inflated.

As shown in FIG. 16, when the side airbag 2 is observed as it is separated in the height-wise direction into the upper part 2*e* corresponding to the height-wise range in which the inflator 6 is stored (which corresponds to the height of the vehicle door belt line and the vicinity) and the lower part 2*d* corresponding to the height-wise range below the inflator 6 (which corresponds to the position of the vehicle door 4), the lower part 2*d* is formed to be directed obliquely downward to the front side in the vehicle front-back direction.

As shown in FIG. 17, the opening portion 2*a* of the side airbag 2 is folded back to the front end in the deployment and inflation direction (hereinafter referred to as the front end in the deployment direction) to overlap the stored position of the inflator 6 and partly placed on the upper part 2*e* of the side airbag 2. The opening portion 2*a* is placed on the upper part 2*e* of the side airbag 2 to face the support surface 7*a* of the seat frame 7.

Then, as shown in FIG. 18, the side airbag 2 has its lower part 2*d* folded upward to be placed on the upper part 2*e*. In the illustrated example, the lower part 2*d* is placed on the upper part 2*e* of the side airbag 2 on the opposite side to the side on which the opening portion 2*a* is folded back or placed to face the vehicle component such as the door 4 and the console box 5.

Then, as shown in FIG. 19, the side airbag 2 has a part on the vehicle front side ahead of the stored position of the inflator 6 (the portion to be the front end in the deployment and inflation direction) that is folded back to the rear side of the vehicle (the rear end side in the deployment and inflation direction) along the folding line F1 set at the front end of the front extended portion extended toward the vehicle front side ahead of the stored position of the inflator 6. The extended portion between the stored position of the inflator 6 and the folding line F1 has the abutment portion Q in abutment against the support surface 7*a* of the seat frame 7 positioned ahead of the inflator 6 in the vehicle front-back direction.

Then, as shown in FIG. 20, after the procedure described in conjunction with FIGS. 7(*a*)-(*c*) and FIGS. 8(*a*)-(*e*) related to the above-described embodiment, the side airbag 2 attains a store state. The superposed portion S having an upper side wider (more loosely rolled or widely folded) than a lower side allows the upper side of the side airbag 2 to be smoothly and swiftly deployed toward the vehicle front side from the seat back 3*a* during deployment and inflation of the side airbag 2, so that the lower side of the superposed portion S is unfolded by the deployment of the upper side of the side airbag 2, immediately followed by the deployment of the lower side of the side airbag 2.

In the deploying and inflating behavior according to the modification, the superposed portion S is deployed and inflated so that the upper side of the side airbag 2 is deployed and inflated first because of the rolled or bellows-like superposed state described above, and then the lower side of the side airbag 2 is deployed and inflated.

The preceding upper side of the side airbag 2 is instantaneously deployed and inflated along the door 4 from the side of the seat back 3*a* to the vehicle front side while being pressed against the door 4 by the folded portion X1. As indicated by the dot-dash chain line Z4, when the upper side of the side airbag 2 is deployed and inflated, the relatively tightly rolled or folded lower side of the superposed portion or the lower side of the side airbag 2 follows the movement and is unfolded as the inflator gas is introduced therein and deployed and inflated toward the vehicle front side from the side of the seat back 3a.

As shown in FIG. 18, when the lower part 2d in the up-down direction of the side airbag 2 is folded to be placed on the upper part 2e before the folded portion X1 and the superposed portion S are formed, the lower part 2d is deployed and inflated upward with relative to the upper part 2e in the process of deployment and inflation of the superposed portion S.

Therefore, as indicated by the solid line Z5, the side airbag 2 has its upper part 2e deployed and inflated facing the side window and the door 4 in the vicinity and its lower part 2d directed obliquely downward to face the door 4 during deployment and inflation. The effects can be equally ensured for the vehicle side airbag device 1 provided on the side of the console box 5.

As for the superposed portion S, the lower side of the side airbag 2 is gradually unfolded from the rolled or bellows-like shape and deployed and inflated following the deployment and inflation of the upper side of the side airbag 2, so that the side airbag 2 is directed downward during deployment and inflation.

According to the modification, the side airbag 2 can be deployed and inflated downward at sufficiently satisfactory deployment speed while the property of how the side airbag 2 can be stored in the seat back 3a is secured.

While the above description constitutes the preferred embodiment of the present invention, it will be appreciated that the invention is susceptible to modification, variation and change without departing from the proper scope and fair meaning of the accompanying claims.

The invention claimed is:

1. A vehicle side airbag device, comprising:
a side airbag provided inside a vehicle seat and adapted to be deployed and inflated from the seat into between an occupant and a vehicle component positioned laterally to the occupant in a vehicle-widthwise direction; and
an inflator attachable to a seat frame of the seat and causing inflator gas to be introduced into the side airbag,
the inflator being stored inside the side airbag near a rear end thereof in a deployment and inflation direction,
in a spread state, the side airbag having a folding portion with a folding line and a superposed portion in series sequentially from a side of the inflator to a front end of the inflator in the deployment and inflation direction, in a stored state before deployment, the folding portion being formed to include an abutment portion folded back to a vehicle rear side from a vehicle front side and abutted against the seat frame during attachment to the seat on a front side of the inflator in a vehicle front-back direction, the superposed portion being formed to be superposed in a rolled state or collapsed in a bellows-like state to have a lower side wider than an upper side in a height-wise direction,
the folding portion being folded to be arranged between the seat frame and the superposed portion in the vehicle-widthwise direction, and
wherein the side airbag is folded to have an upper part in a downward direction placed on a lower part before the folding portion and the superposed portion are formed.

2. The vehicle side airbag device of claim 1, wherein the folding portion is configured to be capable of pushing out the superposed portion toward the vehicle component in the vehicle-widthwise direction upon receiving a reaction force from the seat frame during deployment and inflation of the side airbag.

3. The vehicle side airbag device of claim 1, wherein the vehicle component is a vehicle door.

4. The vehicle side airbag device of claim 1, wherein the vehicle component is a console box provided on a center side in the vehicle in the vehicle-widthwise direction.

5. The vehicle side airbag device of claim 1, further comprising in the spread state, the side airbag has an additional folding portion with an additional folding line between the folding portion and the superposed portion, in a stored state before deployment, the additional folding portion is formed to be folded back at least once along the additional folding line to the vehicle rear side from the vehicle front side or in an arrangement parallel to the folding portion, and the superposed portion is arranged between the additional folding portion and the folding portion in the vehicle-widthwise direction.

6. A vehicle side airbag device, comprising:
a side airbag provided inside a vehicle seat and adapted to be deployed and inflated from the seat into between an occupant and a vehicle component positioned laterally to the occupant in a vehicle-widthwise direction; and
an inflator attachable to a seat frame of the seat and causing inflator gas to be introduced into the side airbag,
the inflator being stored inside the side airbag near a rear end thereof in a deployment and inflation direction,
in a spread state, the side airbag having a folding portion with a folding line and a superposed portion in series sequentially from a side of the inflator to a front end of the inflator in the deployment and inflation direction, in a stored state before deployment, the folding portion being formed to include an abutment portion folded back to a vehicle rear side from a vehicle front side and abutted against the seat frame during attachment to the seat on a front side of the inflator in a vehicle front-back direction, the superposed portion being formed to be superposed in a rolled state or collapsed in a bellows-like state to have an upper side wider than a lower side in a height-wise direction,
the folding portion being folded to be arranged between the seat frame and the superposed portion in the vehicle-widthwise direction, and
wherein the side airbag is folded to have a lower part in an upward direction placed on an upper part before the folding portion and the superposed portion are formed.

7. The vehicle side airbag device of claim 6, wherein the folding portion is configured to be capable of pushing out the superposed portion toward the vehicle component in the vehicle-widthwise direction upon receiving a reaction force from the seat frame during deployment and inflation of the side airbag.

8. The vehicle side airbag device of claim 6, wherein the vehicle component is a console box provided on a center side in the vehicle in the vehicle-widthwise direction.

9. The vehicle side airbag device of claim 6, further comprising in a spread state, the side airbag has an additional folding portion with an additional folding line between the folding portion and the superposed portion, in a stored state before deployment, the additional folding portion is formed to be folded back at least once along the additional folding line to the vehicle rear side from the vehicle front side or in an arrangement parallel to the folding portion, and the superposed portion is arranged between the additional folding portion and the folding portion in the vehicle-widthwise direction.

10. The vehicle side airbag device of claim 6, wherein the vehicle component is a vehicle door.

* * * * *